2,995,446
TREATMENT OF BEVERAGES AFFECTED BY METAL CASSE
Ernest Freed, 1216 Hawthorn, Winston-Salem, N.C.
No Drawing. Filed June 5, 1958, Ser. No. 739,975
4 Claims. (Cl. 99—36)

This invention relates to wine and other fermented or unfermented fruit juices. More particularly the invention relates to a treatment of such beverages, primarily of wine, against a form of spoilage known as metal casse. The treatment described in this patent will both permanently cure such beverages from existing spoilage as well as protect them against later deterioration. The treatment according to this invention does not introduce any harmful agent; the ingredients used in this process are, in their constituent parts, naturally occurring in fruit. Furthermore, only exceedingly small amounts of the reagent are used in the process.

Metal casse is a frequent form of spoilage which causes serious inconvenience and losses, particularly in the wine industry. The wines affected by it lose their clarity, often after they have been bottled and shipped. The spoilage is caused by an excessive content of iron and/or copper, of which metals only a few parts per million are compatible with a sound product. Such small excess amounts of heavy metals can easily be introduced into the wine by metallic equipment used in production, or may be due to insecticides (copper), or to a heavier metal content of the soil (iron). A number of processes are known for the treatment of casse affected wines, or other fruit juices, all aiming at the removal of the heavy metals mentioned. Some of these processes require prolonged treatment, involving several steps, others—such as the well known "blue fining"—rely on the use of undesirable additives and require expert supervision. Often the treatment does not give reliable and lasting results and affects the delicately balanced flavor of wine.

I have found, and this is the object of this invention, that by the use of certain phosphates a cure of casse affected beverages can be accomplished. By the addition of small amounts of phosphates—less than 0.5%—the positive constituent of which is either an alkali metal, or calcium, or hydrogen, or a combination of these, excess amounts of heavy metals can be removed. The compounds mentioned are entirely harmless, being natural constituents of all fruit, and the small amount required assures minimum interference with the flavor bodies. The removal of heavy metals by these compounds is probably the combined effect of (1) the formation of insoluble metal phosphates, (2) the strong "salt" effect of the trivalent phosphate ion on the heavy metal complexes present in colloidal form and (3) of adsorption phenomena. The precipitates which are readily formed on addition of small amounts of phosphates and which contain the heavy metal contamination, are easily filterable and a permanently sparkling, clear beverage is obtained.

I have further found that among the phosphates mentioned the insoluble, or nearly insoluble, calcium phosphates are particularly well suited for the purpose. These compounds, which are prepared by precipitating calcium ions with phosphate ions, vary in their composition according to the ratio of the starting reagents and the pH of the medium. They may contain basic groups and small amounts of molecularly bound water, dependent on the final degree of drying. Those approaching the composition of the tertiary compound are especially valuable for this process as they combine low solubility with sufficient reactivity.

These compounds, being water insoluble or poorly soluble, are applied in the form of a fine slurry, a concentration of 0.2% usually being well in excess of the quantity required. After having been well stirred in they form a fine suspension which settles in the course of a few hours. The sediment will include the precipitated heavy metal contamination. To insure best results other conditions, such as temperature, time of stirring, pH, etc. will be adjusted according to the wine under treatment.

The following example sets out the process in detail: A batch of 5,000 liters of casse affected white wine is run into a vat, or tank, with a stirring device. A slurry is prepared from 20 lb. of the calcium phosphate compound and about 50 liters of the wine, conveniently in a small tank fixed above the bulk container and fitted with an efficient stirrer and outlet. This slurry is run into the main tank, while the wine is being stirred, and stirring continues for 5 minutes. After overnight standing the clear wine is pumped out and passed through a suitable filter. The pH is adjusted to the original value by the addition of citric acid. Before and during treatment the wine has been held at a temperature of 40° F.

By this procedure the iron content has dropped to less than half the original value and copper has been reduced similarly. No further cloud or precipitate formation is noticeable in the bottles, even after prolonged standing.

Having thus described the invention what I claim is:

1. In a process for removing contaminating metal from fruit juice, the steps of mixing in said fruit juice a slurry containing a solid inorganic calcuim phosphate compound which is substantially insoluble in said fruit juice to thereby cause a precipitate which includes said contaminating metal, and afterwards separating said precipitate from said fruit juice.

2. The process defined by claim 1, wherein said mixing step is carried out at a substantially uniform temperature, said temperature being approximately 40° F.

3. A fining process for a fruit juice containing heavy metal, and which includes the steps of: adding to said fruit juice a solid inorganic calcium-containing phosphate salt, mixing said salt with said fruit juice to thereby precipitate said heavy metal as an insoluble compound formed by the presence of said salt in said fruit juice, and thereafter separating said insoluble compound and said solid inorganic calcium-containing phosphate salt from said fruit juice.

4. The fining process defined by claim 3, wherein said fruit juice is combined with a sufficient quantity of said solid inorganic calcium-containing phosphate salt to precipitate at least one half the heavy metal contained therein, said quantity being from approximately 0.2% to approximately 0.5% of the total weight of said fruit juice.

References Cited in the file of this patent

UNITED STATES PATENTS

| | | |
|---|---|---|
| 748,865 | Hewitt | Jan. 5, 1904 |
| 1,957,375 | Vingerhoets | May 1, 1934 |
| 2,105,700 | Ramage | Jan. 18, 1938 |
| 2,745,747 | Hennig | May 15, 1956 |